United States Patent [19]

Shiomi et al.

[11] Patent Number: 4,461,809

[45] Date of Patent: Jul. 24, 1984

[54] SURFACE TREATING AGENT AS AN UNDERCOAT ON SURFACE OF POLYOLEFIN SHAPED ARTICLES

[75] Inventors: Teiichi Shiomi; Kotaro Kishimura, both of Ohtake, Japan

[73] Assignee: Mitsui Petrochemical Industries, Ltd., Tokyo, Japan

[21] Appl. No.: 416,377

[22] Filed: Sep. 9, 1982

[30] Foreign Application Priority Data

Sep. 11, 1981 [JP] Japan .............................. 56-142247

[51] Int. Cl.$^3$ ......................... B32B 27/36; C08K 5/01
[52] U.S. Cl. ................................. 428/482; 428/483; 428/516; 428/520; 428/521; 428/522; 428/523; 428/413; 428/424.4; 524/531; 524/536; 264/176 R
[58] Field of Search .............. 428/482, 516, 483, 523, 428/520; 524/536, 531

[56] References Cited

U.S. PATENT DOCUMENTS

| | | | |
|---|---|---|---|
| 3,970,771 | 7/1976 | Davison | 428/523 |
| 4,299,754 | 11/1981 | Shiomi et al. | 524/536 |
| 4,350,740 | 9/1982 | Coran et al. | 428/516 |

*Primary Examiner*—P. Ives
*Attorney, Agent, or Firm*—Sherman & Shalloway

[57] ABSTRACT

A surface treating agent for a shaped article of a polyolefin is provided which is composed of a solution in an organic solvent of a propylene-ethylene copolymer having a monoalkyl ester of a monolefinic dicarboxylic acid, such as monomethyl maleate, grafted thereto. The propylene-ethylene copolymer has a propylene content of 50 to 75 mole %, and a crystallinity, determined by an X-ray diffraction method, of 2 to 20%. The esterification degree of the alkyl ester of the monolefinic dicarboxylic acid is 45 to 100% if the esterification degree is taken as 200% when all of the carboxyl groups of the dicarboxylic acid are esterified. The amount of the monoalkyl ester grafted is 0.5 to 15% by weight. The grafted propylene-ethylene copolymer has an intrinsic viscosity [$\eta$] of at least 0.3 and is dissolved in an amount of 10 to 100 kg per cubic meter of the organic solvent. The surface treating agent is suitable as an undercoat for a polyolefin shaped article. It greatly improves the adhesion of a paint to the polyolefin article, and has excellent storage stability.

7 Claims, No Drawings

SURFACE TREATING AGENT AS AN UNDERCOAT ON SURFACE OF POLYOLEFIN SHAPED ARTICLES

This invention relates to a surface treating agent suitable for improving the adhesion of a paint or the like to a shaped article of a polyolefin, and more specifically, to a surface treating agent having excellent storage stability.

The surface of a shaped article of a polyolefin such as polypropylene is frequently coated with a paint, or another resin layer is bonded to it, in order to obtain a final desired product for various usages. It is known however that a polyolefin article has poor adhesion to general paints because of its low polarity, and efforts have been made to improve the adhesion of its surface to paints by treating it with chromic acid, a solvent, or flame. These techniques, however, have the defect that a complex treatment is required, or a risk is involved because of using corrosive chemicals, or a rigorous process control must be exercised in order to impart stable adhesiveness.

As one effective means for remedying these defects, there has been used a method in which the surface of a polyolefinic shaped article is treated with an undercoat, etc., and several surface treating agents have been proposed for use in this method. One of them is a surface treating agent composed of a solution in an organic solvent of a specified propylene-ethylene copolymer to which maleic acid or its anhydride is grafted (U.S. Pat. No. 4,299,754). This surface treating agent acts as a primer and permits formation of a paint film of good adhesion on the surface of a polyolefinic shaped article, which paint film has excellent resistance to gasoline, etc. and also to severe temperature changes. Although this surface treating agent is effective for providing a paint film having excellent long-lasting adhesion, it may increase in viscosity or crystallize when stored under special conditions, for example at high temperatures and humidities. Thus, depending upon the storage conditions, this surface treating agent may cause inconveniences.

It is an object of this invention therefore to eliminate the aforesaid defects of surface treating agents proposed heretofore, and to provide a surface treating agent having improved storage stability without impairing the durable adhesion of a paint film formed on the surface of a polyolefinic shaped article.

The above object is achieved in accordance with this invention by a surface treating agent coated as an undercoat on the surface of a polyolefin shaped article coated with a paint, said agent being composed of a solution in an organic solvent of a modified polymer resulting from graft copolymerization of a propylene-ethylene copolymer with an alkyl ester of a monolefinic dicarboxylic acid, said propylene-ethylene copolymer having a propylene content of 50 to 75 mole% and a crystallinity, determined by an X-ray diffraction method, of 2 to 20%, the amount of said alkyl ester of the monolefinic dicarboxylic acid grafted being 0.5 to 15% by weight, said alkyl ester of the monolefinic dicarboxylic acid having an esterification degree of 45 to 100% if the esterification degree is taken as 200% when all of the carboxylic groups of the dicarboxylic acid are esterified, and said modified polymer having an intrinsic viscosity $[\eta]$, determined in decalin solution at 135° C., of 0.3 to 20 (dl/g) and being dissolved in an amount of 10 to 100 kg per cubic meter of the organic solvent.

The propylene-ethylene copolymer as a starting material for the modified polymer has a crystallinity, determined by an X-ray diffraction method, of 2 to 20%, preferably 5 to 18%. Preferably used is a propylene-ethylene random copolymer having a crystallinity of 2 to 20%. The propylene content of the copolymer is 50 to 75 mole%, preferably 55 to 75 mole%, especially preferably 60 to 70 mole%. Its molecular weight is such that its intrinsic viscosity $[\eta]$, determined in decalin solution at 135° C., is 0.3 to 20 dl/g, preferably 0.3 to 10 dl/g. A propylene-ethylene copolymer having an intrinsic viscosity $[\eta]$ of more than 20 dl/g could be used, but it takes time to dissolve it in an organic solvent. If the copolymer has an intrinsic viscosity of less than 0.3 dl/g or a propylene content of less than 50 mole%, a paint film tends to have poor gasoline resistance. A propylene-ethylene copolymer having a crystallinity of more than 20% is difficult to dissolve in an organic solvent, and is therefore unsuitable for use as a surface treating agent. Even a substantially amorphous propylene-ethylene copolymer may be used if its crystallinity is not more than 20%. If the crystallinity is less than 2%, a paint film tends to have poor gasoline resistance.

The monoalkyl ester of a monolefinic dicarboxylic acid to be grafted to the propylene-ethylene copolymer is an ester obtained by esterifying one of the carboxyl groups of a monolefinic dicarboxylic acid, such as maleic adid, citraconic acid, itaconic acid, glutaconic acid, 3-methyl-2-pentenedioic acid, 2-methyl-2-pentenedioic acid or 2-hexenedioic acid with an alkyl alcohol. It has an esterification degree of 45 to 100%, preferably 80 to 100%, provided that the esterification degree is taken as 200% when the two carboxyl groups of the dicarboxylic acid are esterified. If the esterification degree is less than 45%, the resulting surface treating agent lacks storage stability. If it exceeds 100%, a paint film has excellent initial adhesion but poor water resistance.

The alkyl moiety of the above alkyl ester is represented by the general formula $C_nH_{2n+1}$, such as methyl, ethyl, n-propyl, n-butyl, isopropyl, octyl or 2-ethylhexyl.

Examples of preferred monoalkyl esters of monolefinic dicarboxylic acids are monoalkyl maleates such as monomethyl maleate, monoethyl maleate, mono-n-propyl maleate and monoisopropyl maleate.

Maleic acid or its monoalkyl ester has a reduced possibility of being homopolymerized when it is graft-copolymerized with the propylene-ethylene copolymer, thus making it easy to inhibit the formation of a homopolymer thereof.

The modified polymer is obtained, for example, by graft copolymerizing the monoalkyl ester of a monolefinic dicarboxylic acid with the propylene/ethylene copolymer; or by graft copolymerizing a monolefinic dicarboxylic acid or its anhydride with the propylene-ethylene copolymer and then esterifying one of the carboxyl groups with an alkyl alcohol.

The amount of the monoalkyl ester of the monolefinic dicarboxylic acid grafted to the propylene-ethylene copolymer is 0.5 to 15% by weight, preferably 3 to 10% by weight. If the amount is less than 0.5% by weight, the adhesion of a coated film prepared from the resulting surface treating agent to paints, etc. is insufficient, and the coated film has poor gasoline resistance. Furthermore, if it exceeds 15% by weight, the intrinsic viscosity $[\eta]$ of the graft-modified copolymer decreases.

Hence, the cohesive force of the coated layer decreases, and the water resistance of the coated film is reduced.

The crystallinity of the graft-modified copolymer is nearly equal to, or slightly smaller, than that of the unmodified propylene-ethylene copolymer.

Various known methods can be utilized in grafting the monoalkyl ester of a monolefinic dicarboxylic acid, a monolefinic dicarboxylic acid, or a monolefinic dicarboxylic acid anhydride to the propylene-ethylene copolymer. For example, the graft copolymerization may be performed by dissolving the propylene-ethylene copolymer in an organic solvent, adding the monomer and a radical generator, and heating the mixture with stirring; by melting the propylene-ethylene copolymer under heat, adding the monomer and a radical generator to the molten copolymer, and stirring the resulting mixture; or by feeding these components into an extruder and subjecting them to graft-copolymerization conditions.

The surface treating agent of this invention can be obtained by dissolving the modified polymer in an organic solvent. In particular, if the propylene-ethylene copolymer is subjected to graft copolymerization in the form of a solution in an organic solvent, a surface-treating agent composed of an especially homogeneous modified polymer can be obtained. In this case it is preferred that the monomer and the radical generator be added successively in portions to the unmodified propylene-ethylene copolymer solution. This prevents precipitation or gellation of the propylene-ethylene copolymer, and enables the monomer to be grafted homogeneously to the copolymer.

The concentration of the polymer in the surface treating agent of this invention should be properly chosen depending upon its manner of application. Usually, a surface treating agent in which the concentration of the modified copolymer in an organic solvent solution is 10 to 100 kg/m$^3$, especially 20 to 75 kg/m$^3$, is suitable for spray coating. If a surface treating agent having a polymer concentration of less than 10 kg/m$^3$ is spray-coated, coating unevenness tends to occur on the coated surface, and variations are liable to occur in paint adhesion. If the polymer concentration exceeds 100 kg/m$^3$, the primer layer formed is liable to be thick, sticky, and uneven in thickness. Moreover, the smoothness of the surface after coating tends to be poor.

Preferred conditions for the graft copolymerization are as follows: To an organic solvent solution of the propylene-ethylene copolymer in a concentration of 10 to 500 kg, preferably 100 to 400 kg, per m$^3$ of the organic solvent is added 1 to 100 millimoles/minute/kg-copolymer, preferably 2 to 20 millimoles/minute/kg-copolymer, successively in portions. Preferably, the radical generator is added successively in portions, and the rate of addition is from about $5 \times 10^{-5}$ to 50 millimoles/minute/kg-copolymer, preferably from about $10^{-2}$ to 5 millimoles/minute/kg-copolymer. The mole ratio of the radical initiator to the monomer is about 1/100 to 3/5, preferably about 1/20 to ½.

Preferably, the grafting reaction is carried out by heating the copolymer solution with strong stirring. The suitable reaction temperature is from the melting point to 200° C., especially from about 120° to about 160° C. The reaction time is usually 2 to 10 hours. The reaction operation is carried out either batchwise or continuously. For performing uniform grafting, the batchwise method is preferred.

Any radical generator which promotes the reaction of the propylene-ethylene copolymer with the monomer can be used in the grafting reaction. Organic peroxides and organic peresters are especially preferred. Specific examples include benzoyl peroxide, dichlorobenzoyl peroxide, dicumyl peroxide, di-tert-butyl peroxide, 2,5-dimethyl-2,5-di(peroxybenzoate)hexyne-3, 1,4-bis(-tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate, and tert-butyl perdiethyl acetate. Azo compounds, such as azobisisobutyronitrile and dimethyl azoisobutyrate, may also be used. Of these, dialkyl peroxides, such as dicumyl peroxide, di-tert-butyl peroxide, 2,5-dimethyl-2,5-di(tert-butylperoxy)hexyne-3, 2,5-dimethyl-2,5-di(-tert-butylperoxy)hexane, and 1,4-bis(tert-butylperoxyisopropyl)benzene, are preferred.

When the propylene-ethylene copolymer is to be modified in an organic solvent and the resulting solution is to be used as a spray coating solution having a polymer concentration of 10 to 100 kg per m$^3$ of the organic solvent with or without diluting it with the same or a different organic solvent, it is preferred to use radical generators whose decomposition products are relatively low boiling substances, such as di-tert-butyl peroxide, tert-butyl peroxyisobutyrate and tert-butyl peroxyoctoate. If such radical generators are used, their decomposition products can be removed by volatilization during the drying of the spray-coated surface treating agent for the removal of the organic solvent. Consequently, the adhesion of the undercoat to paints becomes much better.

Examples of the organic solvent are aromatic hydrocarbons such as benzene, toluene and xylene, aliphatic hydrocarbons such as hexane, heptane, octane and decane, and chlorinated hydrocarbons such as trichloroethylene, perchloroethylene, dichloroethylene, dichloroethane and chlorobenzene. The aromatic hydrocarbons are preferred, and alkyl-substituted aromatic hydrocarbons are especially preferred.

The shaped article of polyolefin to which the surface treating agent of this invention is applied can be obtained by known melt-shaping methods such as injection molding, compression molding, blow molding, extrusion molding and rotational molding. Suitable polyolefins used as a raw material are homopolymers of alpha-olefins such as ethylene, propylene, 1-butene, 1-hexene, 1-heptene, 4-methyl-1-pentene, 1-octene and 1-decene, styrene, and alpha-methylstyrene, and copolymers of these with each other. Specific examples include low density polyethylene (obtained by a high-pressure or medium to low pressure method), medium density polyethylene, high density polyethylene, polypropylene (homo polymer, random copolymer, block copolymer), polybutene and polystyrene; an ethylene-/vinyl acetate copolymer, an ethylene/acrylic acid copolymer, and an ethylene/vinyl chloride copolymer, and ethylene propylene diene terpolymer (EPDM), which are among copolymers of an alpha-olefin with a small amount of another copolymerizable monomer such as vinyl acetate, acrylic acid, acrylic esters, vinyl alcohol, vinyl chloride, ethylidenenorbornene and 1,4-hexadiene; and modified polymers obtained by modifying the above polymers with unsaturated carboxylic acids such as maleic acid and 5-norbornene-2,3-dicarboxylic acid, or the acid anhydrides or acid amides thereof. Mixtures of these may also be used.

Especially good adhesion to paints can be obtained when an inorganic filler and a pigment, such as talc, zinc oxide, glass fibers, titanium white and magnesium sulfate, are incorporated in these polyolefins.

The polyolefins may contain additives such as stabilizers, ultraviolet absorbers, or hydrochloric acid absorbers. Examples of stabilizers which are preferred include phenolic stabilizers such as 2,6-di-tert-butyl-4-methylphenol, tetrakis[methylene-3(3,5-di-tert-butyl-4-hydroxy-phenyl)-propionate]methane, n-octadecyl-3-(4'-hydroxy-3',5'-di-tert-butylphenyl)propionate, 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2-thiobis(4-methyl-6-tert-butylphenol), 1,3,5-trimethyl-2,4,6-tris(3,5-di-tert-butyl-4-hydroxybenzyl)benzene, and 1,3,5-tris(2-methyl-4-hydroxy-5-tert-butylphenol)butane; sulfur-type stabilizers such as dilauryl thiodipropionate and distearyl thiodipropionate; and phosphorus-type stabilizers such as tridecyl phosphite and trinonylphenyl phosphite. Preferred ultraviolet absorbers include 2-hydroxy-4-octoxybenzophenone, 2-ethylhexyl-2-cyano-3,3-diphenyl acrylate and p-octylphenyl salicylate. Preferred hydrochloric acid absorbers include calcium stearate and hydrotalcite.

The surface treating agent of this invention can be applied to a polyolefin article by various known methods, for example methods involving the use of a brush, a roll, a spray, etc., or a method comprising dipping the polyolefin article in the surface treating agent. The surface treating agent having a polymer concentration of 10 to 100 kg/m$^3$ of solvent is particularly suitable for spray coating.

The surface treating agent of this invention may be used in the heated state, but its performance can be fully exhibited at ordinary temperatures. After the treatment, the shaped article is dried by spontaneous drying, or forced heated drying.

After the surface of the polyolefin article is undercoated with the surface treating agent of this invention, a top coat is applied by electrostatic coating, spray coating, brush coating, etc. The top coat may be applied after forming a primer. There is no particular restriction on paints used. When it is desired to obtain a paint film having especially high adhesion, it is preferable to use solvent-type thermoplastic acrylic resin paints, solvent-type heat-curable acrylic resin paints, acrylic-modified alkyd resins, epoxy resin paints, and polyurethane paints.

The coated paint of the polyolefin article is cured by usual methods, such as electrical heating, infrared heating, and high frequency heating. The curing conditions can also be determined depending upon the material or the shape of the polyolefin article and the properties of the paints used.

Even when the surface treating agent of this invention is left to stand at a high temperature and a high humidity, the modified polymer scarcely undergoes gellation or precipitation. Furthermore, there is no need to store the surface treating agent in a dark cold place or to properly control it during use, as in the case of conventional surface treating agents. In addition, the adhesion, smoothness and durability of a paint or the like applied to a polyolefin article through an undercoat of the surface-treating agent of this invention are excellent.

Accordingly, polyolefin articles treated with the surface treating agent of this invention are used widely in automobile parts, industrial component parts, and electrical appliances.

The following examples illustrate the present invention more specifically.

EXAMPLE 1

Production of a polymer graft-modified with a monoalkyl dicarboxylate:

In an autoclave, 240 ml of toluene was added to 75 g of a propylene-ethylene copolymer having a propylene content of 60 mole%, an intrinsic viscosity [$\eta$], measured in decalin solution at 135° C., of 1.93 dl/g and a crystallinity, measured by X-ray diffraction, of 12%. The inside of the autoclave was purged with nitrogen for 1 hour. The mixture was heated to 145° C. to dissolve the copolymer completely. Then, a solution of 6.9 g of maleic anhydride in 30 ml of toluene and a solution of 2.4 g of di-tert-butyl peroxide in 30 ml of toluene were continuously added dropwise over the course of 4 hours. After the addition, the reaction was carried out at 145° C. for 2 hours. A graft-modified polymer (to be referred to as MAH-PER) containing 4.2% by weight of maleic anhydride grafted thereto was obtained.

5.8 ml (corresponding to two moles per mole of maleic anhydride) of methanol was added at a time to the reaction mixture resulting from the graft copolymerization (polymer concentration 250 g/liter of toluene), and the mixture was heated at 145° C. for 2 hours to give a solution of monomethyl maleate-grafted propylene-ethylene copolymer (to be referred to as MMM-PER).

Infrared absorption spectroscopy showed that monomethyl maleate having an esterification degree of 100% was grafted to the copolymer.

Toluene was added to the above solution of MMM-PER (250 g/liter of toluene) to dilute it to a concentration of 75 g/liter of toluene, and the temperature of the diluted solution was gradually cooled from 90° C. to 30° C. at a rate of 25° C./hr. Furthermore, at room temperature, the concentration of the solution was adjusted to 45 g/liter of toluene.

Storage stability test:

One hundred milliliters of the resulting solution was taken into a 100 ml beaker. With no covering over the beaker, it was put in a desiccator containing water at 50° C. Thus, an accelerated storage stability test was conducted. The storage stability was evaluated by the observation of the solution and its viscosity measured by a B-type viscometer (VISCONIC-EDM, a trade mark for a product of Tokyo Keiki K.K.) at 25° C. The results are shown in Table 1.

EXAMPLES 2 TO 6

Using the MAH-PER solution obtained in Example 1, a monoalkyl maleate-modified grafted propylene-ethylene copolymer was prepared as in Example 1 except that each of methanol, ethanol, n-propanol, n-butanol and isopropanol was used and the reaction conditions were changed properly as shown in Table 1. The storage stability test shown in Example 1 was carried out. The results are shown in Table 1.

COMPARATIVE EXAMPLE 1

Example 1 was followed except that the MAH-PER solution obtained in Example 1 was not esterified. The results are shown in Table 1.

TABLE 1

| Example | Alcohol | Esterification degree (%) | Viscosity changes by the accelerated storage stability test (cps at 25° C.) | | | | | | |
|---|---|---|---|---|---|---|---|---|---|
| | | | At start | 10th day | 20th day | 30th day | 40th day | 50th day | 60th day |
| 1 | Methanol | 100 | 15 | 15 | 15 | 15 | 15 | 15 | 15 (clear) |
| 2 | Ethanol | 100 | 15 | 15 | 15 | 15 (clear) | — | — | — |
| 3 | n-Propanol | 100 | 15 | 15 | 15 | 15 (clear) | — | — | — |
| 4 | n-Butanol | 100 | 15 | 15 | 15 | 15 (clear) | — | — | — |
| 5 | Methanol | 80 | 15 | 25 | 30 | 33 (whitely turbid) | — | — | — |
| 6 | i-Propanol | 85 | 15 | 23 | 26 | 28 (whitely turbid) | — | — | — |
| 10 | Methanol | 100 | 15 | 15 | 15 | 15 (clear) | — | — | — |
| Comp. Ex. 1 | — | 0 | 15 | 70 (whitely turbid) | 105 | 130 | 140 | — | — |

EXAMPLE 7 AND COMPARATIVE EXAMPLE 2

Polypropylene (Mitsui Petrochemical Polypro ® SJ 310, a trademark for a product of Mitsui Petrochemical Industries, Ltd.) was injection-molded into a sheet having a size of 50 mm × 50 mm × 1 mm.

The MMM-PER solution and the MAH-PER solution obtained in Example 1 and Comparative Example 1, before the storage stability test and after the test for 7 days, were each spray-coated onto the resulting sheet by an air spray method, and dried by standing for about 5 minutes at room temperature.

Each of the undercoated sheets was coated with a paint obtained by diluting a urethane-type paint (R-257, a trademark for a product of Nippon Bee Chemical Co., Ltd.) with a thinner to a ratio of about 1:1, and baked in an air oven at 80° C. for 30 minutes.

Each of the resulting coated sheets was left to stand at room temperature for 24 hours, and subjected to each of the following tests. The peel test was conducted by providing knife cuts on the coated surface of the sheet both lengthwise and crosswise to form 100 square sections, applying an adhesive tape (Nichiban Cellotape ®, a trademark for a product of Nichiban K.K.) to the cut surface, peeling off the adhesive tape, and counting the number of the remaining square sections on the sheet which is the measure of the adhesion of the coated layer.

Initial adhesion

Each sheet sample was directly subjected to the peel test.

Water resistance

Each sheet sample was dipped in warm water at 40° C. for 240 hours and then subjected to the peel test.

Gasoline resistance

Each sheet sample was dipped in petroleum benzine at 25° C. for 24 hours and then subjected to the peel test.

Thermal shock resistance

Each sheet sample was subjected to successive three cycles of the following temperature history, and then to the peel test.

−30° C. for 1 hour→room temperature for 3 minutes→boiling water for 1 hour→room temperature for 5 minutes.

The results are shown in Table 2.

EXAMPLE 8

Production of a propylene-ethylene copolymer having a monoalkyl dicarboxylate grafted thereto:

One kilogram of pellets of a propylene-ethylene copolymer having a propylene content of 60 mole%, an intrinsic viscosity $[\eta]$ of 1.93 dl/g and a crystallinity of 12% were mixed with 400 g of maleic anhydride and 200 g of 2,5-dimethyl-2,5-di(tert-butylperoxy)hexyne-3. The mixture was fed into a hopper of an extruder having a screw diameter of 25 mm and kept at 200° C. The screw set in the extruder was of the Dulmage type with an L/D ratio of 25 and was operated at a speed of 60 rpm. The strand discharged from the extruder die was cooled with ice water, and fed into a granulator to convert it into pellets. The crude pellets obtained were added to xylene and dissolved in it by heating. The solution was cooled to room temperature, and then a large amount of acetone was added to obtain a crump-like polymer precipitate. The precipitate was repeatedly washed with a large amount of acetone, and dried in vacuum at room temperature for 2 days. The resulting purified modified copolymer had a maleic anhydride unit content of 3.5% by weight.

Then, 150 g of the modified copolymer was added to 1 liter of toluene. After purging the reaction system with nitrogen, the temperature was raised to 145° C. to dissolve the modified copolymer uniformly. Then, 4.4 ml (corresponding to 2 moles per mole of maleic anhydride) of methanol was added to the solution and esterification was performed for 2 hours to give a modified propylene-ethylene copolymer having grafted thereto monomethyl maleate with an esterification degree of 100%.

EXAMPLE 9

Toluene (240 ml) was added to 75 g of a propylene-ethylene copolymer having a propylene content of 60 mole%, an intrinsic viscosity $[\eta]$, determined in decalin solution at 135° C., of 1.93 dl/g, and a crystallinity, determined by X-ray diffraction, of 12% in an autoclave. The inside of the autoclave was purged with nitrogen for 1 hour. The mixture was heated to 145° C. to dissolve the copolymer completely. A solution of 8.0 g of citraconic anhydride in 30 ml of toluene and a solution of 2.4 g of di-tert-butyl peroxide in 30 ml of toluene were simultaneously added dropwise continuously over 4 hours. After the addition, the mixture was maintained at 145° C. for 2 hours to give a propylene-ethylene copolymer having 3.5% by weight of citraconic anhydride grafted thereto. Then, 5.8 ml (corresponding to 2 moles per mole of citraconic anhydride) of methanol was added at a time to the reaction mixture (polymer concentration 250 g/liter of toluene) resulting from the graft copolymerization, and the mixture was heated at 145° C. for 2 hours to obtain a solution of a propylene-ethylene copolymer having monomethyl citraconate grafted thereto. The esterification degree of citraconic anhydride was found to be 100% by infrared absorption spectroscopy.

Toluene was added to the solution (250 g/liter of toluene) obtained by the above esterification to dilute it to a polymer concentration of 75 g/liter of toluene. Then, the solution was gradually cooled from 90° C. to 30° C. at a rate of 25° C./hr. Furthermore, at room temperature, the polymer concentration of the solution was adjusted to 45 g/liter of toluene.

EXAMPLE 10

The solution finally obtained in Example 9 was subjected to the same storage stability test as described in Example 1. The results are shown in Table 1.

EXAMPLE 11

The solution finally obtained in Example 9 was subjected to the adhesion test described in Example 7 and Comparative Example 2. The results are shown in Table 2.

COMPARATIVE EXAMPLE 3

To the MAH-PER solution obtained in Example 1 were added 2 moles, per mole of MAH, of methanol and a very small amount of p-toluenesulfonic acid. The mixture was heated at 145° C. for 5 hours. The esterification degree of maleic anhydride was found to be 180% by infrared absorption spectroscopy. The polymer concentration of the solution was adjusted to 45 g/liter of toluene by the method shown in Example 1.

The resulting solution was subjected to the adhesion test shown in Example 7 and Comparative Example 2.

The results are also shown in Table 2.

graft copolymerization of a propylene-ethylene copolymer with an alkyl ester of a monolefinic dicarboxylic acid, said propylene-ethylene copolymer having a propylene content of 50 to 75 mole% and a crystallinity, determined by an X-ray diffraction method, of 2 to 20%, the amount of said alkyl ester of the monolefinic dicarboxylic acid grafted being 0.5 to 15% by weight, said alkyl ester of the monolefinic dicarboxylic acid having an esterification degree of 45 to 100% provided that the esterification degree is taken as 200% when all of the carboxyl groups of the dicarboxylic acid are esterified, and said modified polymer having an intrinsic viscosity $[\eta]$, determined in decalin solution at 135° C., of 0.3 to 20 (dl/g) and being dissolved in an amount of 10 to 100 kg per cubic meter of the organic solvent.

2. The surface treating agent of claim 1 wherein said alkyl ester is an alkyl maleate.

3. The surface treating agent of claim 1 wherein the crystallinity of said propylene-ethylene copolymer is 5 to 18%.

4. The surface treating agent of claim 1 wherein the propylene content of the propylene-ethylene copolymer is 55 to 75 mole%.

5. The surface treating agent of claim 1 wherein the alkyl ester is obtained by esterifying one of the carboxyl groups of a monolefinic dicarboxylic acid with an alkyl alcohol.

6. The surface treating agent of claim 5 wherein the monolefinic dicarboxylic acid is selected from the group consisting of maleic acid, citraconic acid, itaconic acid, glutaconic acid, 3-methyl-2-pentene-dioic acid, 2-methyl-2-pentenedioic acid and 2 hexenedioic acid.

7. The surface treating agent of claim 5 wherein the

TABLE 2

| Run | Time (days) during which the storage stability test was conducted | Evaluation of the adhesion test ||||
|---|---|---|---|---|---|
| | | Initial adhesion | Water resistance | Gasoline resistance | Thermal shock resistance |
| Example 7 | 0 | 100 | 100 | 100 | 100 |
| | 7 | 100 | 100 | 100 | 100 |
| Example 11 | 0 | 100 | 100 | 100 | 100 |
| | 7 | 100 | 100 | 100 | 100 |
| Comparative Example 2 | 0 | 100 | 100 | 100 | 100 |
| | 7 | (spraying impossible) | (spraying impossible) | (spraying impossible) | (spraying impossible) |
| Comparative Example 3 | 0 | 100 | 50 | 50 | 50 |

What we claim is:

1. A surface treating agent coated as an undercoat on the surface of a polyolefin shaped article to be coated with a paint, said agent being composed of a solution in an organic solvent of a modified polymer resulting from mono-alkyl ester is selected from the group consisting of monomethyl maleate, monoethyl maleate, mono-n-propyl maleate and monoisopropyl maleate.

* * * * *